(12) United States Patent
Nishikawa et al.

(10) Patent No.: US 6,725,606 B2
(45) Date of Patent: Apr. 27, 2004

(54) VEHICLE DOOR HAVING ANTI-THEFT COVER MEMBER

(75) Inventors: Ikuo Nishikawa, Hiroshima (JP); Chikashi Kawamoto, Hiroshima (JP); Kenichi Ogawa, Hiroshima (JP); Noboru Shouno, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/790,270

(22) Filed: Feb. 21, 2001

(65) Prior Publication Data

US 2001/0017472 A1 Aug. 30, 2001

(30) Foreign Application Priority Data

Feb. 29, 2000 (JP) .......................... 2000-053668

(51) Int. Cl.[7] .................................................. B60J 5/04
(52) U.S. Cl. ............................................................ 49/502
(58) Field of Search .......................... 49/502, 348, 349; 296/146.7

(56) References Cited

U.S. PATENT DOCUMENTS

| | | | | |
|---|---|---|---|---|
| 4,603,894 A | * | 8/1986 | Osenkowski | 292/216 |
| 5,050,350 A | * | 9/1991 | Bertolini et al. | 49/502 |
| 5,535,553 A | * | 7/1996 | Staser et al. | 49/502 |
| 5,617,676 A | * | 4/1997 | Kleefeldt et al. | 49/502 |
| 5,752,346 A | * | 5/1998 | Kritzler et al. | 49/503 |
| 5,904,002 A | * | 5/1999 | Emerling et al. | 49/502 |
| 5,931,682 A | * | 8/1999 | Takiguchi et al. | 439/34 |
| 6,076,882 A | * | 6/2000 | Szerdahelyi et al. | 296/146.1 |
| 6,139,088 A | * | 10/2000 | Okamoto et al. | 296/146.6 |
| 6,233,875 B1 | * | 5/2001 | Carlo et al. | 49/502 |
| 6,409,250 B1 | * | 6/2002 | Schultheiss | 296/146.7 |
| 6,438,899 B1 | * | 8/2002 | Feder et al. | 49/502 |

FOREIGN PATENT DOCUMENTS

JP 09-156374 6/1997

* cited by examiner

Primary Examiner—Gregory J. Strimbu
(74) Attorney, Agent, or Firm—Brooks Kushman P.C.

(57) ABSTRACT

A vehicle door comprises an outer door panel, an inner door panel formed with an aperture, a plastic mounting panel to which functional devices of the vehicle door are installed. The plastic mounting panel is installed to the inner door panel to close up the aperture. A door lock/unlock mechanism is attached to the inner door panel and a linking member is connected to the lock/unlock mechanism through which the lock/unlock mechanism is operated to lock and unlock the vehicle door. The linking member extends along an inner side of the plastic mounting panel, passes through a guide hole formed in the plastic mounting panel and extends along an exterior side of the plastic mounting panel. A cover member covers the lock/unlock mechanism and the part of the linking member on the exterior side of the plastic mounting panel to prevent unauthorized access.

8 Claims, 19 Drawing Sheets

VEHICLE DOOR HAVING ANTI-THEFT COVER MEMBER

BACKGROUND OF THE PRESENT INVENT

1. Field of the Invention

The present invention relates to a vehicle door comprising an outer door panel, an inner door panel formed with an aperture and a plastic mounting panel to which functional devices of the vehicle door and door parts are mounted and which is installed to the inner door panel to cover up the aperture of the inner door panel with an intention to provide a lightweight vehicle door which needs a decreased number of parts and is easy to assemble, and a process of assembling the vehicle door.

2. Description of the Related Art

Typically, vehicle doors are made up of a door panel assembly comprising a steel inner door panel and a steel outer door panel to which various functional parts and devices of the door, such as a window regulator and a door lock/unlock mechanism, are directly installed, In such as a vehicle door, because it is necessary to install various functional devices and associated parts in a space formed between the outer and inner door panels, the vehicle door is hard to be light in weight in addition to poor suitability of the plastic mounting panel for assembling work and a necessity of a large number of parts.

In an attempt to solve the aforementioned drawbacks, there has been proposed a vehicle door which comprises an outer door panel made of a steel sheet, an inner door panel made up of a metal main panel and a plastic auxiliary panel formed as one piece. The outer door panel has an outer door wall formed as a part integral with an inner frame defining a large aperture in which the inner door panel is fitted. Various functional devices and associated parts of the door are assembled to the inner door panel before fitting the inner door panel to the outer door panel. One of such vehicle doors is known from, for example, Japanese Unexamined Patent Publication No.9-156374.

In the case where the plastic auxiliary panel is separately prepared, the inner door panel can be unrestrictedly provided with various intricate shapes. As a result, since various fitting members such as clips are unnecessary to assemble the functional parts and devices of the door and, in addition, the functional parts and devices of the door are allowed to be disposed at various locations, a significant effect is produced in terms of increasing the degree of freedom for laying out internal constituent parts in the inside of the vehicle door. On the other hand, since a door lock/unlock operating member such as a cable linking a door lock/unlock mechanism is usually disposed in the space of the vehicle door formed between the outer door panel and the inner door panels, the vehicle door is possibly unlocked by dishonestly or intentionally operating the door lock/unlock operating member through a gap in the window, more specifically, between an upper edge of the outer door panel and a window glass. This places the vehicle under unreliable prevention from robberies.

SUMMARY OF THE INVENTION

It is therefore an object of the present invention to provide a vehicle door which has improved antitheft door structure.

It is another object of the present invention to provide a vehicle door in which a linking member linking a door handle with a door lock/unlock mechanism is arranged such as to pass through a linking member guide hole of a plastic mounting panel from near an aperture of an inner door panel and then extend along the plastic mounting panel on a near side to the passenger compartment.

It is another object of the present invention to provide a vehicle door having reliable antitheft door structure in which a cover member covers a door lock/unlock mechanism and a linking member linking a door handle with the door lock/unlock mechanism which extends along a plastic mounting panel partly on a far side from a passenger compartment.

It is another object of the present invention to provide a vehicle door having a plastic mounting panel with a cover secured thereto for covering a door lock/unlock mechanism and a linking member linking a door handle with the door lock/unlock mechanism which extends along a plastic mounting panel partly on a far side from a passenger compartment which provides suitability of the cover for assembling work.

It is still another object of the present invention to provide a vehicle door having a plastic mounting panel with a cover formed as a part integral therewith which reduces the number of parts of the vehicle door and provides improved suitability of the vehicle door for assembling work.

It is a further object of the present invention to provide a process of assembling a vehicle door comprising an outer door panel disposed on a far side from a passenger compartment of a vehicle, an inner door panel formed with an aperture and disposed on a near side to the passenger compartment and a plastic mounting panel, which includes a step of mounting a door lock/unlock mechanism and a linking member through which the door lock/unlock mechanism is operated to lock and unlock the vehicle door to the plastic mounting panel and then covering them by a cover member and a step of installing the plastic mounting panel to the inner door panel so as to close up the aperture of the inner door panel.

The aforesaid objects of the present invention are achieved by a vehicle door comprising an outer door panel disposed on a far side from a passenger compartment of a vehicle, an inner door panel formed with an aperture and disposed on a near side to the passenger compartment, and a plastic mounting panel to which functional devices of the vehicle door and door parts are mounted and which is installed to the inner door panel to cover up the aperture of the inner door panel, which comprises a door lock/unlock mechanism mounted to the plastic mounting panel on the far side from the passenger compartment and a linking member connected to the door lock/unlock mechanism through which the door lock/unlock mechanism is operated to lock and unlock the vehicle door, the linking member passing through a linking member guide hole formed in the plastic mounting panel from near the aperture of the inner door panel and extending along the plastic mounting panel partly on the far side from the passenger compartment and partly on the near side to the passenger compartment. The vehicle door thus comprised has the linking member disposed outside a space between the inner door panel and the outer door panel, so as to provide the vehicle with an improved antitheft effect.

The vehicle door is preferably provided with a cover member which covers the door lock/unlock mechanism and a part of the linking member extending along the plastic mounting panel on the far side from the passenger compartment. The cover member reliably prevents the door lock/unlock mechanism and/or the linking member from an access from the outside of the vehicle with a foul intention to run away with the vehicle.

The cover member is fixedly secured to the plastic mounting panel previously mounting the door lock/unlock mechanism and/or the linking member to the plastic mounting panel P. Otherwise, the cover member may be formed in position as a part integral with the plastic mounting panel. The vehicle door may further comprise an anchor member operative to anchor the linking member which is formed as a part integral with the plastic mounting panel. Further, the vehicle door may comprise a bracket member operative to hold a door handle connected to the linking member which is formed as a part integral with the plastic mounting panel. This integral structure enables to install the plastic mounting panel with the door lock/unlock mechanism and the linking member to the plastic mounting panel P mounted thereto and the cover member to the inner door panel all at once with an effect of simplifying assembling work and is of great advantage to decreasing the number of door parts to be assembled.

The vehicle door which comprises an outer door panel disposed on a far side from a passenger compartment of the vehicle, an inner door panel formed with an aperture and disposed on a near side to the passenger compartment, and a plastic mounting panel to which functional devices of the vehicle door and door parts are mounted and which is installed to the inner door panel to close up the aperture of the inner door panel is assembled by a process comprising the steps of attaching a door lock/unlock mechanism, a linking member through and a cover member to the plastic mounting panel such that the cover member covers the door lock/unlock mechanism and the linking member from a far side from a passenger compartment of the vehicle and installing the plastic mounting panel with the door lock/unlock mechanism and the linking member covered by the cover member to the inner door panel.

According to the process of assembling the vehicle door, the door lock/unlock mechanism, the linking member and the cover member are previously attached in position to the plastic mounting panel as a sub-assembly and thereafter the sub-assembly is installed to the inner door panel. This process improves suitability of the vehicle door for assembling work.

BRIEF DESCRIPTION OF THE DRAWINGS

The above and other objects and features of the present invention will be clearly understood from the following description with respect to the preferred embodiments thereof when considered in conjunction with the accompanying drawings, in which.

DETAILED DESCRIPTION OF THE PREFERRED EMBODIMENT

Although the following description is directed to a front door of a vehicle by way of example, the present invention is applicable to a rear door and a back door with the same effects.

Figure 1:
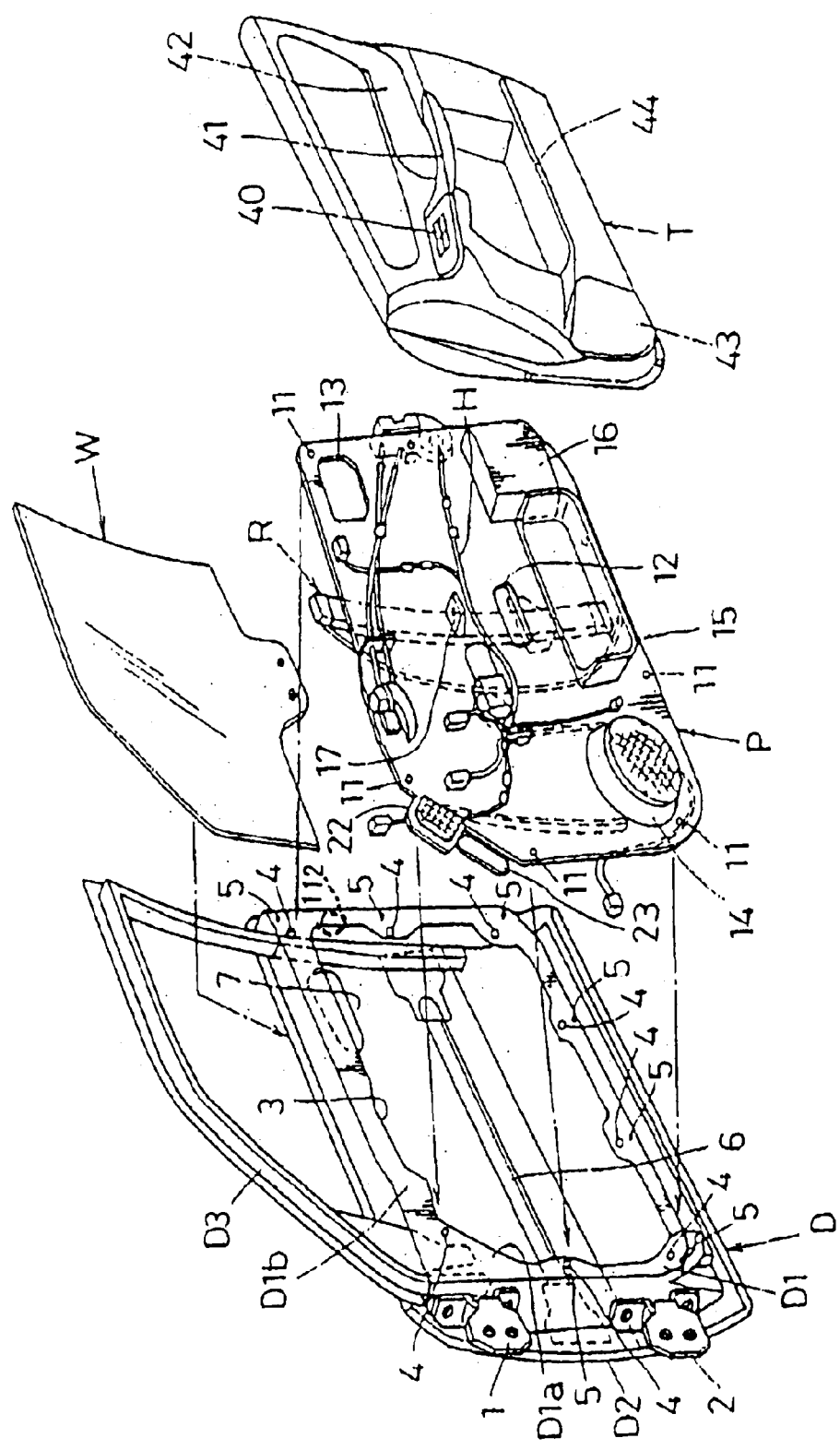
FIG. 1 is an exploded view of a vehicle door in accordance with a preferred embodiment of the present invention.
Figure 2:
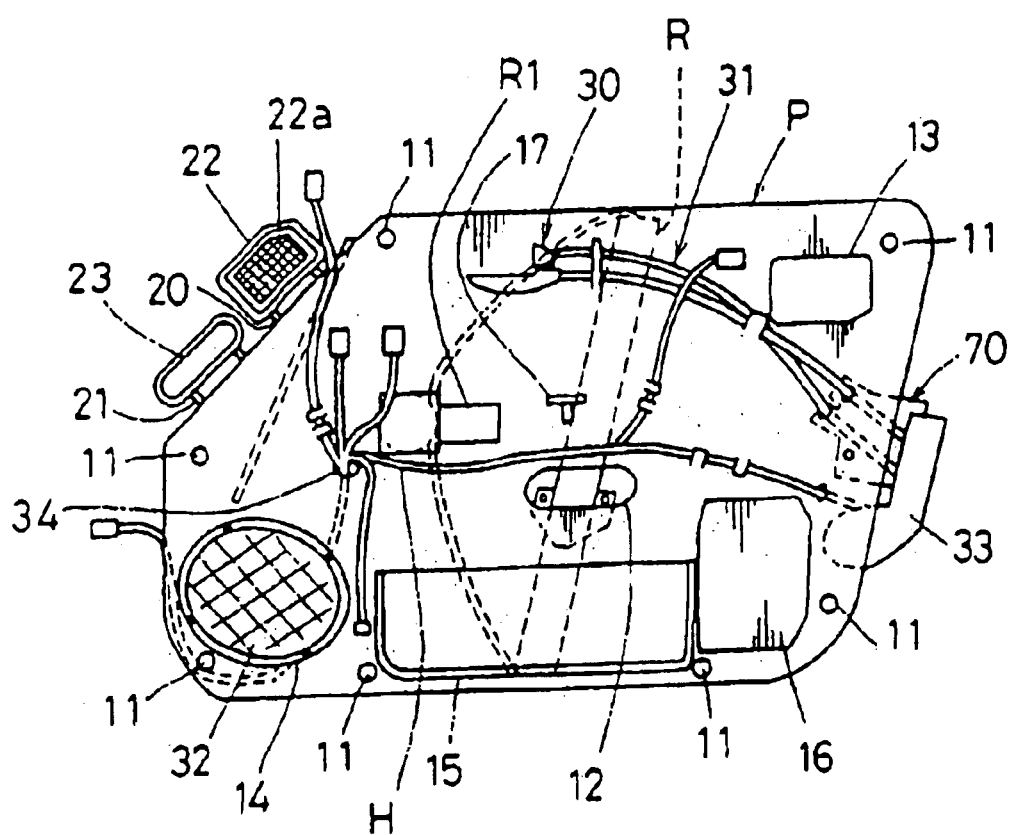
FIG. 2 is a front view of a plastic panel as viewed from a passenger compartment.
Figure 3:
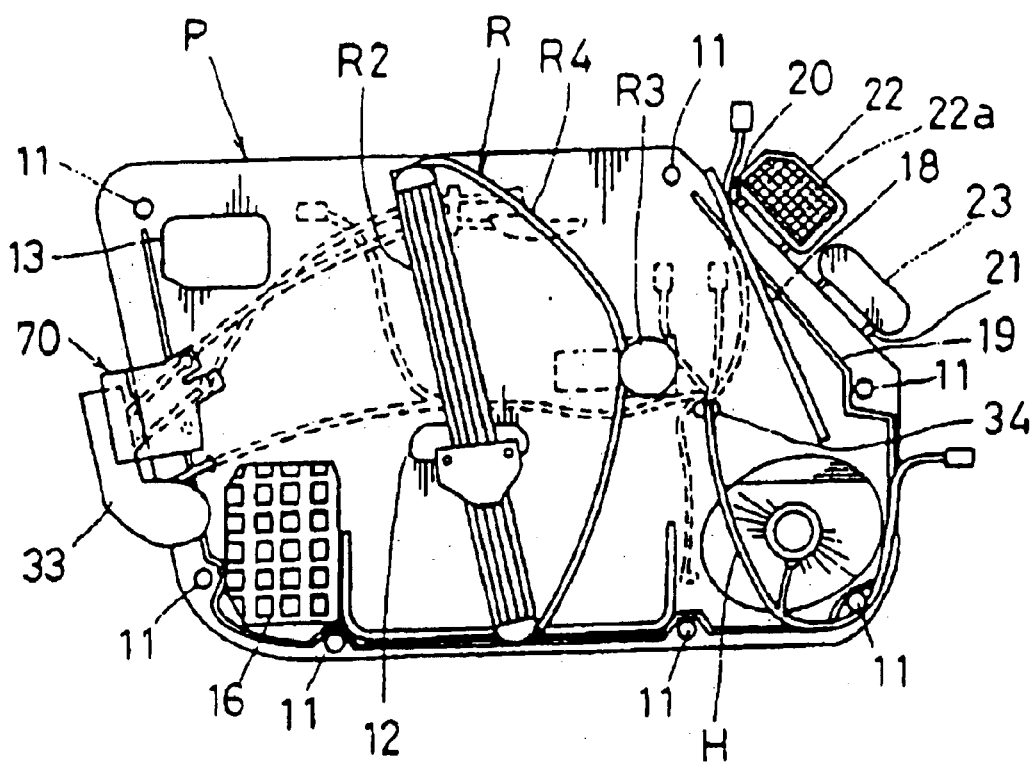
FIG. 3 is a rear view of the plastic panel as viewed from the outside of the passenger compartment.

Referring to the drawings in detail, and, in particular, to FIGS. 1 to 3 showing a front door of a vehicle (which will be referred to as a vehicle door for simplicity) in accordance with a preferred embodiment of the present invention, the vehicle door is made up of a door panel sub-assembly D comprising a steel inner door panel D1 disposed on a side near to a passenger compartment of the vehicle, a steel outer door panel D2 disposed on a side far from the passenger compartment, a steel window sash D3, a plastic mounting panel P, and a trim unit T which forms a side wall of a passenger compartment. The window sash D3, which is shaped such as to have a front part inclined rearward as viewed from the front of the vehicle, receives a window glass W therein. The door panel sub-assembly D at its front end is provided upper and lower hinges 1 and 2. The inner door panel D1 has a generally rectangular aperture 3 formed below a belt line and has a front ton corner D1a uncut. An upper mounting panel portion D1b above the belt line and integral with the uncut part D1a provides the inner door panel D1 with structural rigidity at least necessary for an inner panel. The inner door panel D1 is formed with a plurality of holes 4 arranged around the aperture 3 for fastening clips and set screws (not shown) for attaching the plastic mounting panel P and the trim unit T to the door panel sub-assembly D.

The door panel sub-assembly D is equipped with an impact bar 6 extending in a lengthwise direction of the vehicle between the inner door panel D1 and the outer door panel D2 in order to provide the door panel sub-assembly D with increased rigidity against side impact thereon. The outer door panel D2 is provided with an exterior door handle 7 at its rear top corner thereof. The plastic mounting panel P has an overall shape in almost conformity to the aperture 3 of the inner door panel D1. The plastic mounting panel P is formed with a plurality of holes 11 arranged along the peripheral margin so as to correspond in position to the holes 4 of the inner door panel D1. Further, the plastic mounting panel P at its center portion is formed with an opening 12 for an access to the inside of the door panel sub-assembly D for installing the window glass W to a window regulator R. The plastic mounting panel P at its rear top corner is formed with an opening 13 for an access to the inside of the door panel sub-assembly D for connecting a wire cable and its associated parts to the exterior door handle 7. The plastic mounting panel P is further formed with a speaker mount 14, a pocket 15 and a side crash pad 16 operative to absorb energy of an impact, all of which are arranged in the lengthwise direction at a lower portion of the plastic plate P and project toward the passenger compartment, and a bracket 17 positioned at a center thereof. The trim unit T is fixed to the plastic mounting panel P, and hence the door panel sub-assembly D, through the bracket 17.

As shown in detail in FIG. 3 showing an appearance of the plastic mounting panel P is viewed from the outside of the passenger compartment, the plastic mounting panel P is formed and provided with various constituent parts including at least a window glass guide rail 18, a sealing member 19, and access opening covers 22 and 23. Specifically, the window glass guide rail 18 is attached to a front portion of the plastic mounting panel P so as to guide up and down movement of the window glass W. The sealing member 19, which is made of, for example, waterproof rubber strip, is attached to the plastic mounting panel P so as to extend along the periphery except an upper side of the plastic mounting panel P. The access opening cover 22 is formed as an appendant part to the plastic mounting panel P at a front upper cutaway corner so as to be easily separated from the plastic mounting panel P by breaking away joints 20 after it has been attached to the plastic mounting panel P to cover up the access opening 13. Similarly, the access opening cover 23 is formed as an appendant part to the plastic mounting panel P at the front upper cutaway corner so as to be easily separated from the plastic mounting panel P by breaking away joints 21 after it has been attached to the plastic mounting panel P to cover up the access opening 12. The access opening cover 22 is formed with a shock absorbing lattice structure comprising ribs 22a and installed to the plastic mounting panel P such that, when the plastic mounting panel P is installed to the door panel sub-assembly D, the access opening cover 22 absorbs impact from the exterior door handle 7.

As shown in FIGS. 1 to 3, the plastic mounting panel P is additionally provided with various functional parts and devices including at least an interior door handle 30, a handle linking cables 31, a motor R1 of the window regulator R and a front speaker 32 which are at the inner side of the plastic mounting panel P as viewed from the passenger compartment, and a guide rail R2, a drum pulley R3 and a cable R4 forming parts of the window regulator R and a door lock/unlock mechanism provided in a form of door latch unit 33 (schematically depicted in FIG. 2) which are at the outer side of the plastic mounting panel P as viewed from the passenger compartment. These functional parts and devices are attached to the plastic mounting panel P before the plastic mounting panel P is installed to the door panel sub-assembly D. Specifically, the interior door handle 30 is installed to an upper portion of the inner side of the plastic mounting panel P as viewed from the passenger compartment. The handle cable 31 extends from the interior door handle 30 and the door latch unit 33. The motor R1 is installed to the center portion of the plastic mounting panel P. The front speaker 32, which forms a part of an audio system, is mounted to the speaker mount 14. The guide rail R2, the drum pulley R3 and the cable R4 are mounted to the center portion of the plastic mounting panel P. The door latch unit 33, which is engaged by a body striker (not shown), is mounted to a rear portion of the plastic mounting panel P. The plastic mounting panel P is additionally provided with harnesses H for supplying electric power to various electric constituent parts. The harnesses extend passing through a center hole 34, front half portions thereof extending on the outer side of the plastic mounting panel P as depicted by a solid line in FIG. 3 and rear half portions thereof extending on the inner side of the plastic mounting panel P as depicted by solid line in FIG. 2.

As seen in FIG. 1, the trim unit T is installed to the door panel sub-assembly D after the plastic mounting panel P is installed so as to form a side wall of the passenger compartment. The trim unit T is formed and provided with various parts and devices including a switch unit 40 having a plurality of switches for actuating at least a power-driven window regulator and a power-driven door latch mechanism, an assist grip 41 and an arm rest 42 extending behind the switch unit 40. In addition, a speaker cover 43 and a pocket wall 44 are formed as appendant parts to the trim unit T. The speaker cover 43 is fitted on the speaker mount 14 so as to cover the front speaker 32. The pocket wall 44 closes one side of the pocket 15 facing the passenger compartment.

The window glass W is installed to the door panel sub-assembly D after the plastic mounting panel P is installed. Specifically, the window glass W is inserted into the door panel sub-assembly D, i.e., between the inner door panel D1 and the outer door panel D2, from the side of the window sash D3, and then, installed to the window regulator R on the plastic mounting panel P.

Details of the respective parts and devices of the vehicle door will be described below in conjunction with FIGS. 4 through 24.

Figure 4:
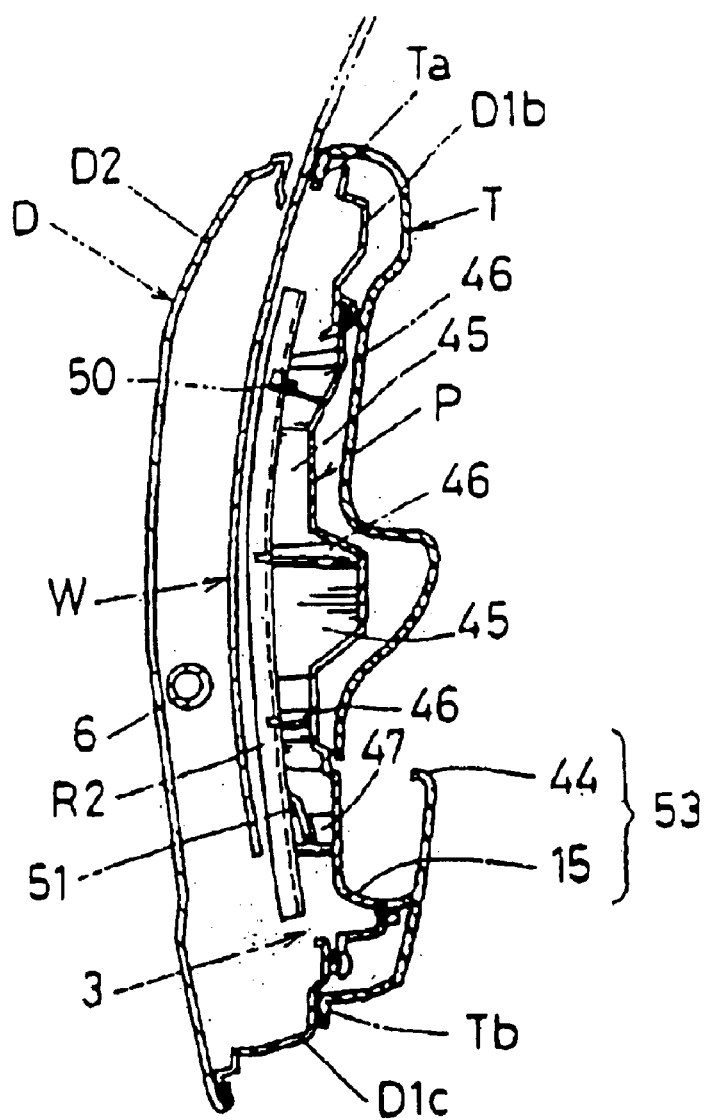
FIG. 4 is a longitudinal-sectional view of a central part of a completed vehicle door.

FIG. 4 shows a completed vehicle door in longitudinal-section along a vertical center line thereof. In an interior space of the door panel sub-assembly D formed between the inner door panel D1 and the outer door panel D2 there is disposed the guide rail R2 of the window regulator R installed to the plastic mounting panel P such as to extend in a direction of height of the vehicle. The window glass W is located on the outer side of the guide rail R2 so as to be guided by the guide rail R2. The impact bar 6 is disposed on the outer side of the window glass W such as to extend in the lengthwise direction. In order to provide the passenger compartment with reliable watertightness, the waterproof sealing strips 19 are firmly caught between the plastic mounting panel P and the inner door panel D1, specifically the upper mounting panel portion D1b and a lower mounting panel portion D1c below the aperture 3 of the inner door panel D1, respectively, so as to block the aperture 3. The guide rail R2 is supported from the outer side thereof by a fixing rib 45, a fixing boss 46 and an engaging boss 47 fixedly attached to or formed as a part integral with the plastic mounting panel P and is installed to the plastic mounting panel P through a fixing bolt 50 at an upper extreme end and a L-shaped tongue 51 at a lower extreme end thereof. The trim unit T is inserted at its upper end Ta between the upper mounting panel portion D1b of the inner door panel D1 and the window glass W and is fixed at its lower end Tb to the lower mounting panel portion Die of the inner door panel D1 so as thereby to be installed to the door panel sub-assembly D and to cover the plastic mounting panel P. The pocket wall 44 is formed as a part integral with the trim unit T and forms an inner side wall of the pocket 15 when the trim unit T is installed to the door panel sub-assembly D so as thereby to complete a box-shaped pocket 53 for small articles.

Figure 5:
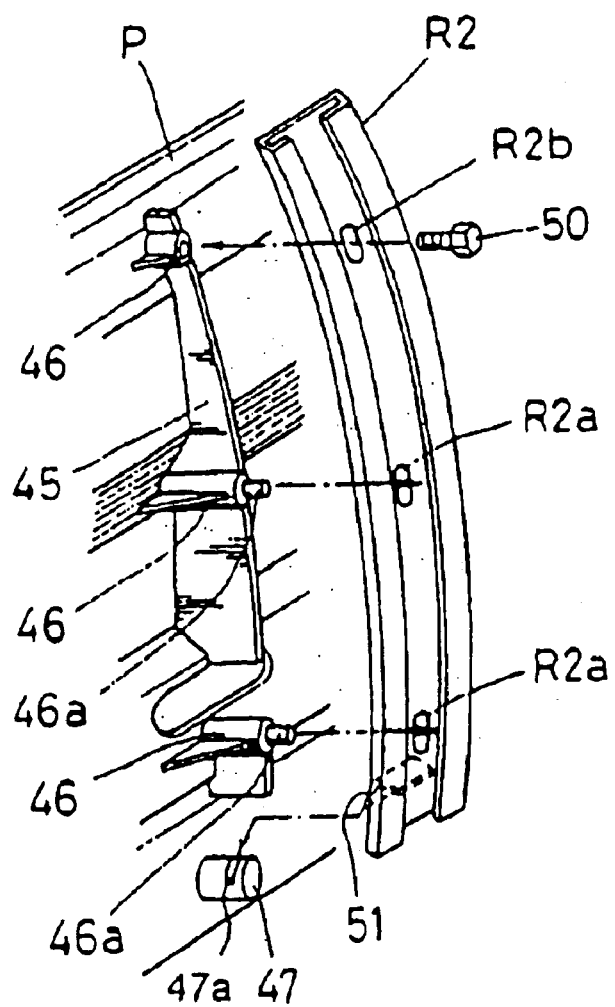
FIG. 5 is an exploded view of a window glass regulator rail of a window regulator.

As shown in FIG. 5, in the installing process of installing the guide rail R2 of the window regulator R to the plastic mounting panel P, after temporarily keeping the guide rail R2 in position relative to the plastic mounting panel P first by inserting the L-shaped tongue 51 of the guide rail R2 into a slot 47a of the engagement boss 47, positioning and engaging pins 46a extending from the fixing bosses 46 are engaged within holes R2a formed in the guide rail R2, respectively. Finally, the fixing bolt 50 is passed through one of the holes R2b and fastened into one of the fixing bosses 46 so as thereby to firmly fix the guide rail R2 to the plastic mounting panel P. In this manner, the assembling work of the guide rail R2 is made easy.

Figure 6:
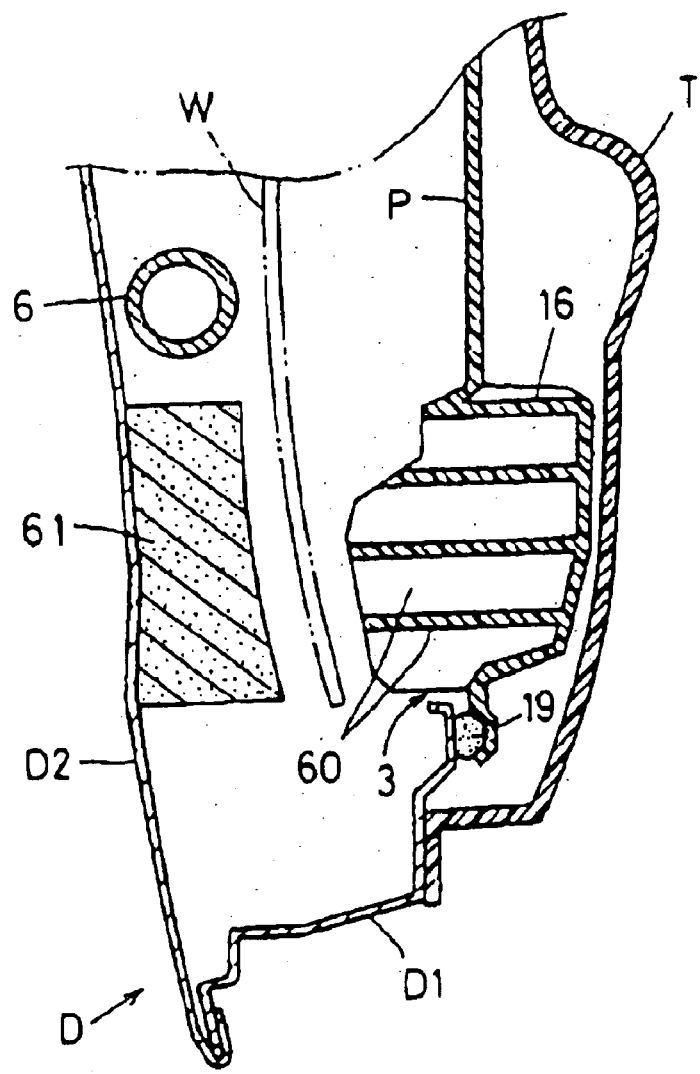
FIG. 6 is a longitudinal-sectional view of a rear lower part of the door panel.
Figure 7:
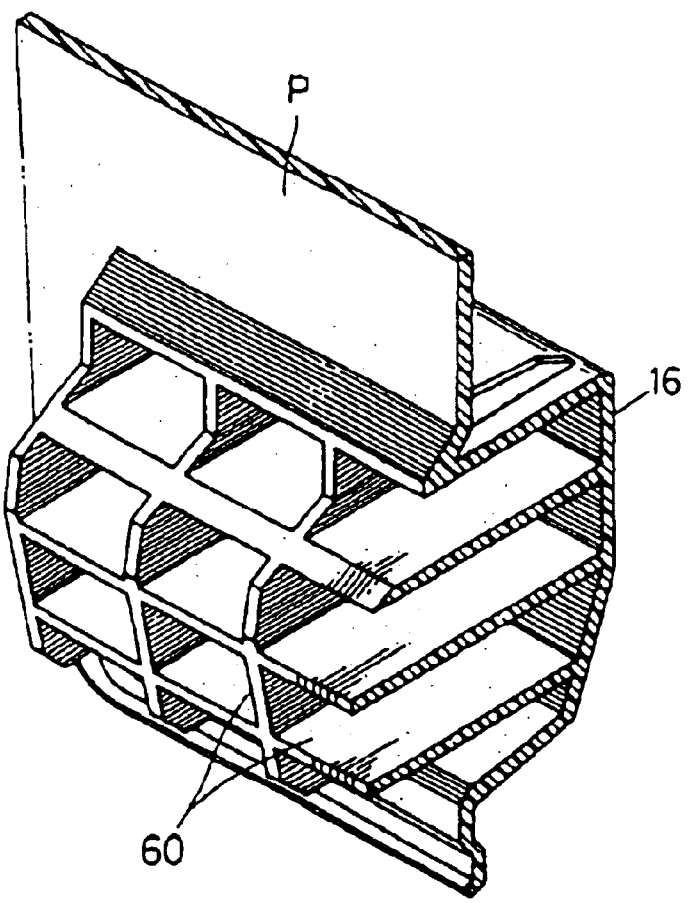
FIG. 7 is a perspective view of a crash pad.

FIGS. 6 and 7 show a rear lower part of the completed vehicle door in longitudinal-section. As shown, the inner side crash pad 16, which is formed as a part integral with the plastic mounting panel P for absorbing energy of a lateral impact against the plastic mounting panel P, projects in a direction from the exterior to the interior of the vehicle such that it extends at least toward the window glass W from the main section of the plastic mounting panel P on the side of the outer door panel D2 and toward the trim unit T on the side of the passenger compartment. The inner side crash pad 16 has an impact absorbing lattice structure comprising a plurality of lengthwise and breadthwise ribs 60 arranged so as to form cells open at their outer ends. The inner side crash pad 16 is formed in a position corresponding to the waist of a passenger sitting on a seat (not shown). This inner side crash pad 16 cooperates with an outer side crash pad 61 attached to the outer door panel D2 so as to receive energy of a lateral impact from the outer door panel D2 through the outer side crash pad 61 upon an occurrence of a side crash. When the side crash pad 16 receives energy of a lateral impact due to a side crash, it transmits a lateral deformation of the vehicle door to the waist of the passenger, so as thereby to force the waist of the passenger away from the vehicle door. This protects the passenger from receiving a blow from the vehicle door.

Figure 8:
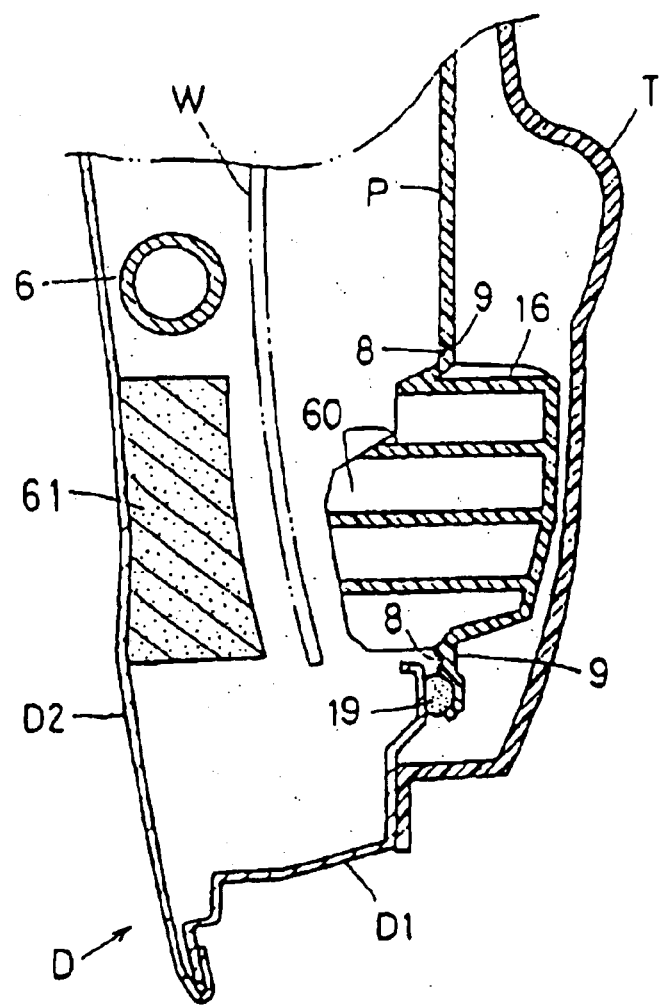
FIG. 8 is a sectional view of another crash pad.

As shown in FIG. 8, the plastic mounting panel P may be additionally provided with a fragile structure 9 comprising grooves 8 formed along a root of the inner side crash pad 16. When the inner side crash pad 16 receives energy of an impact from the outer side crash pad 61 upon an occurrence of a side crash, the fragile structure 9 breaks off along the grooves 8, so that the inner side crash pad 16 moves quickly into the passenger compartment, forcing the waist of the passenger away from the door panel in an early stage of the side crash. Therefore, the inner side pad 16 provided with the fragile structure 9 provides the vehicle with an improved protection performance for the passenger.

Figure 9:
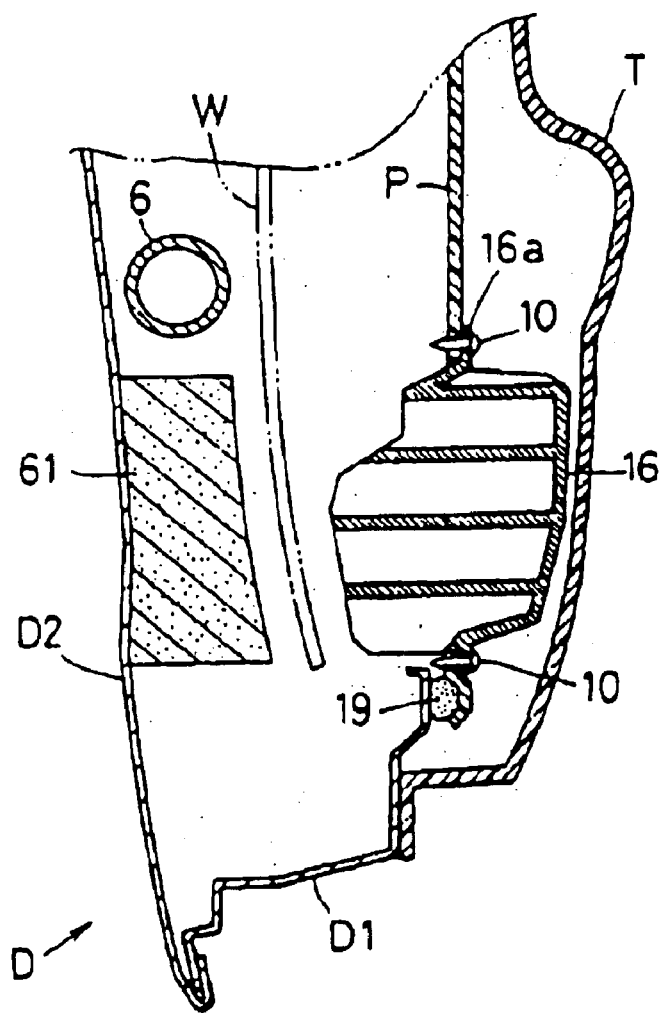
FIG. 9 is a sectional view of still another crash pad.

FIG. 9 shows a variant of the side crash panel P which is provided with a separate side crash pad 16. As shown in FIG. 9, the side crash pad 16 is prepared separately from the plastic mounting panel P and secured to the plastic mounting panel P. Specifically, the plastic mounting panel P is formed with an aperture and the side crash pad 16 has a peripheral flange 16a. The side crash pad 16 is inserted and fitted in the aperture of the plastic mounting panel P by securing the peripheral flange 16a to the plastic mounting panel P by fasteners 10.

Figure 10:
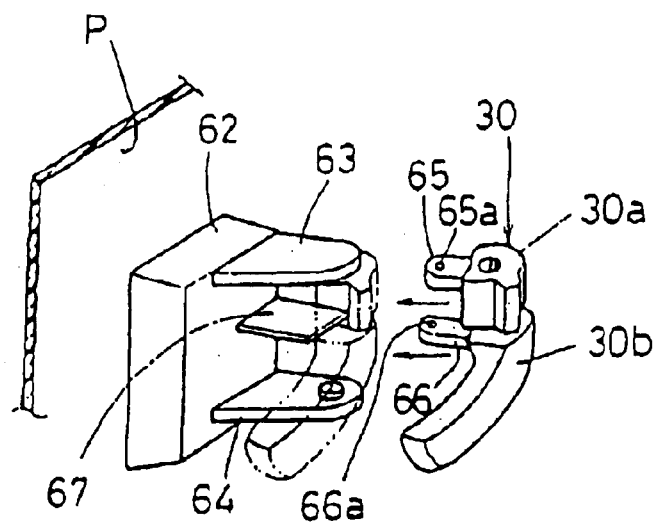
FIG. 10 is an exploded view of a structure for installing an interior door handle to the plastic mounting panel.

FIG. 10 is the interior door handle 30 which is exploded for the purpose of explaining a step of installing the interior door handle 30 to the plastic mounting panel P. As shown, the interior door handle 30 is directly secured to a base block 62 formed as a part integral with the plastic mounting panel P without employing separately provided parts. The interior door handle 30 comprises a door lock knob 30a and a door release or unlock knob 30b. These knobs 30a and 30b are put between upper and lower brackets 63 and 64 extending from the base block 62 of the plastic mounting panel P as depicted by a double-dotted line so as to turn about a vertical axis in opposite directions. The door lock knob 30a has a coupling arm 65 as a part integral therewith and formed with a coupling hole 65a in which a bent end 31c of a cable rod 31a of the handle linking cable 31 is fitted. Similarly, the door unlock knob 30b has a coupling arm 66 as a part integral therewith and formed with a coupling hole 66a in which a bent end 31d of a cable rod 31b of the handle linking cable 31 is fitted. The base block 62 is formed with an intermediate partition 67 extending in parallel to and between the upper and lower brackets 63 and 64.

Figure 11:
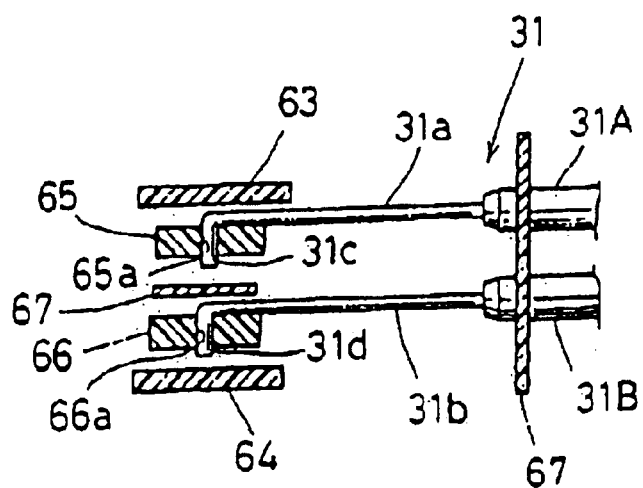
FIG. 11 is a cross-sectional view showing a linkage structure between an interior door handle and handle linking cable.

As depicted in detail in FIG. 11, the handle linking cable 31 is coupled to the interior door handle 30 installed to the base block 62 of the plastic mounting panel P. The handle linking cable 31 comprises the cable rods 31a and 31b and cable rod guide and protection sheaths 31A and 31B. The cable rod 31 a at its extreme end 31c is bent at approximately a right angle and fitted in the coupling hole 65a of the coupling arm 65. The cable rod 31b at its extreme end 31d is bent at approximately a right angle and fitted in the coupling hole 66ab of the coupling arm 66. In the step of coupling the handle linking cable 31 to the interior door handle 31, namely the door lock knob 30a and the door unlock knob 30b, the extreme bent ends 31c and 31d of the respective cable rods 31a and 31b are fitted in the coupling holes 65a and 66a of the coupling arms 65 and 66, respectively, first. Then, the interior door handle is put and pivotally mounted between the upper bracket 63 and the lower bracket 64 so as to locate the coupling arm 65 of the door lock knob 30a between the upper bracket 63 and the intermediate partition 67 and the coupling arm 66 of the door unlock knob 30b between the intermediate partition 67 and the lower bracket 64. The handle linking cable coupling structure makes the upper bracket 63 function as a stopper for preventing the cable rod 31 a from slipping off from the coupling arm 65 of the door lock knob 30a. Similarly, the handle linking cable coupling structure makes the intermediate partition 67 function as a stopper for preventing the cable rod 31b from slipping off from the coupling arm 66 of the coupling arm 66 of the door unlock knob 30b. The cable rod guide awl protection sheaths 31A and 31B are fixedly supported by a bracket 67 of the plastic mounting panel P.

As depicted in detail in FIG. 11, the handle linking cable 31 is coupled to the interior door handle 30 installed to the base block 62 of the plastic mounting panel P. The handle linking cable 31 comprises the cable rods 31a and 31b and cable rod guide and protection sheaths 31A and 31B. The cable rod 31 a at its extreme end 31c is bent at approximately a right angle and fitted in the coupling hole 65a of the coupling arm 65. The cable rod 31b at its extreme end 31d is bent at approximately a right angle and fitted in the coupling hole 66ab of the coupling arm 66. In the step of coupling the handle linking cable 31 to the interior door handle 31, namely the door lock knob 30a and the door unlock knob 30b, the extreme bent ends 31c and 31d of the respective cable rods 31a and 31b are fitted in the coupling holes 65a and 66a of the coupling arms 65 and 66, respectively, first. Then, the interior door handle is put and pivotally mounted between the upper bracket 63 and the lower bracket 64 so as to locate the coupling arm 65 of the door lock knob 30*a* between the upper bracket 63 and the intermediate partition 67 and the coupling arm 66 of the door unlock knob 30*b* between the intermediate partition 67 and the lower bracket 64. The handle linking cable coupling structure makes the upper bracket 63 function as a stopper for preventing the cable rod 31*a* from slipping off from the coupling arm 65 of the door lock knob 30*a*. Similarly, the handle linking cable coupling structure makes the intermediate partition 67 function as a stopper for preventing the cable rod 31*b* from slipping off from the coupling arm 66 of the coupling arm 66 of the door unlock knob 30*b*. The cable rod guide awl protection sheaths 31A and 31B are fixedly supported by a bracket 67 of the plastic mounting panel P.

As described above, the handle linking cable coupling structure thus coupling the cable rod 31 to the interior door handle 30 provides reliable power transmission from the door lock knob 30*a* and the door unlock knob 30*b* to the door latch unit 33 for locking and unlocking the vehicle door, respectively.

Figure 12:
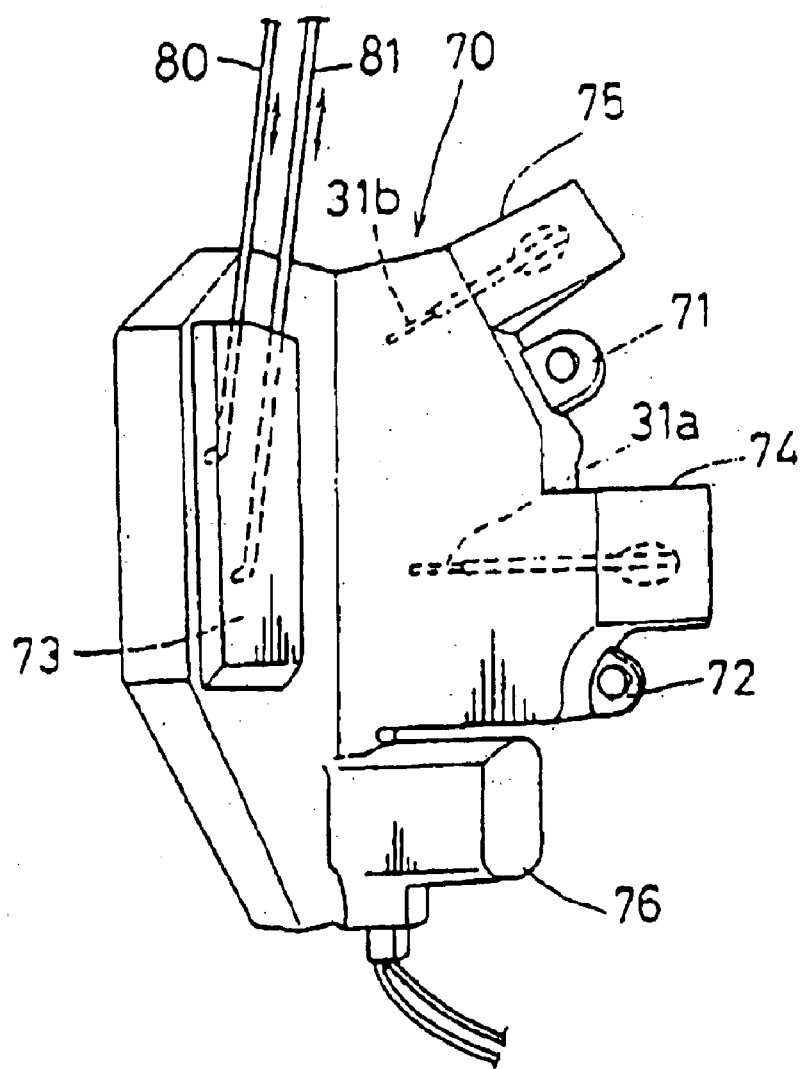
FIG. 12 is a perspective view of a door latch unit cover.

FIG. 12 shows a door latch unit cover 70 by which the door latch unit 33 is covered and protected. The door latch unit cover 70, which is made of a plastic as one piece and has an outer shape in approximately conformity with an outer shape of the door latch unit 33, is fixed to the plastic mounting panel P through fixing brackets 71 and 72 formed as parts integral with the plastic mounting panel P. The door latch unit cover 70 comprises four sections made up as one piece. Specifically, a cover section 73 is located at one of opposite sides of the door latch unit cover 70 to cover a cable rod of a handle linking cable 80 linking the exterior door handle 7 and a cable rod of a cylinder linking cable 81 linking a key cylinder 112. A cover section 74 is located at another side of the door latch unit cover 70 to cover a cable rod 31*a* of the handle linking cable 31 linking the door lock knob 30*a*. A cover section 75 is located above the cover section 74 to cover a cable rod 31*b* of the handle linking cable 31 linking the door unlock knob 30*b*. A cover section 76 is located at lower end of the door latch unit cover 70 to cover a motor (not shown) of the power-driven door latch unit 33.

Figure 13:
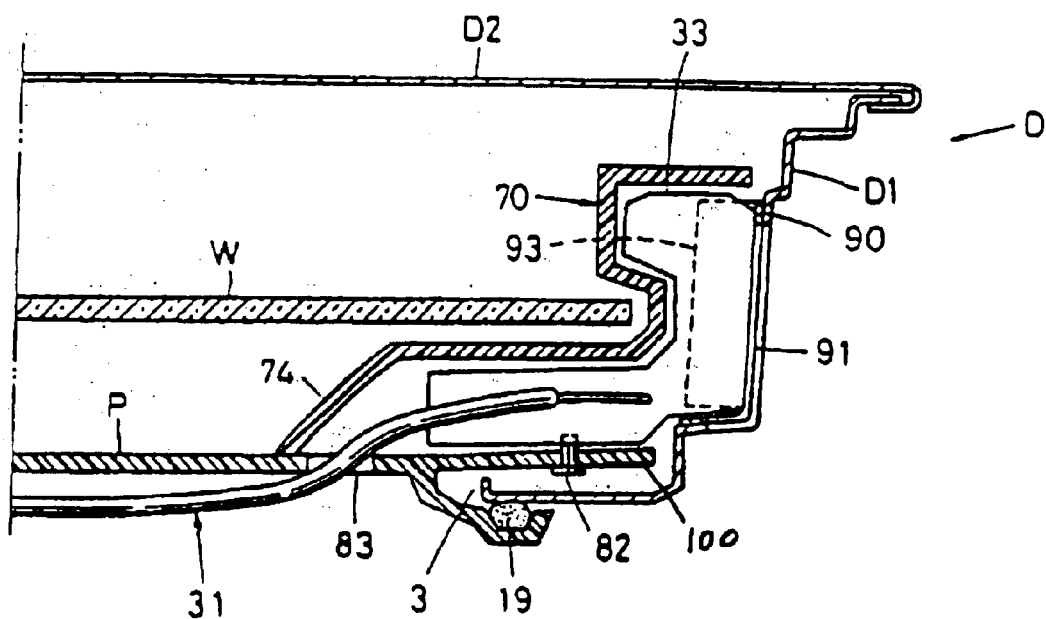
FIG. 13 is a cross-sectional view of a structure surrounding the door latch unit.

FIG. 13 shows the door latch unit 33 and its associated pans covered by the door latch unit cover 70 in cross-section. The door latch unit 33 is secured by fasteners 82 to a mounting extension 100 fanned as an integral part of the plastic mounting panel P from the outer side on which the window glass W and the outer door panel D2 are located. The extension 100 of the plastic mounting panel P extends between the inner door panel D1 and door latch unit cover 70 behind the guide hole 83 formed in the plastic mounting panel P. The door latch unit cover 70 protects the door latch unit 33 from an access from the outside of the vehicle with an intention to run away with the vehicle. The handle linking cable 31 (see FIGS. 1 and 2) extending from the interior door handle 30 along the plastic mounting panel P passes through a hole formed as cable guide means in rear part of the plastic mounting panel P so as to extend to the door latch unit 33 passing through the cable guide hole 83 of the plastic mounting panel P. The cable guide hole 83 of the plastic mounting panel P is covered by the door latch unit cover 70. Because most of the handle linking cable 31 lays on the inner side of the plastic mounting panel P and because the handle linking cable 31 is linked with the door latch unit 33 within the door latch unit cover 70, the handle linking cable 31 is prevented from an access with an intention to run away with the vehicle. In other words, the handle linking cable 31 linking the door latch unit 33 extends from near the aperture 3 of the inner door panel D1 crossing the plastic mounting panel P through the cable guide hole 83 such that the handle linking cable 31 partly lies on the plastic mounting panel P on the side of the outer door panel D2 and covered by the door latch unit cover 70 together with the door latch unit 33 and partly lies on the plastic mounting plate P on the side of the passenger compartment.

Figure 14:
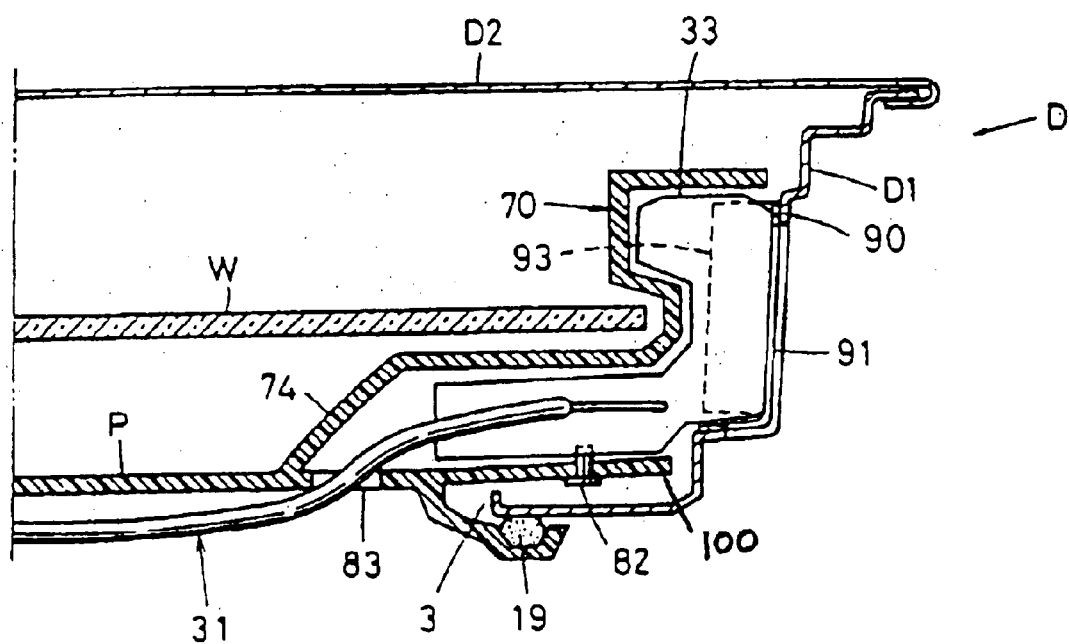
FIG. 14 is a cross-sectional view of another structure surrounding the door latch unit.

Although the door latch unit cover 70 is prepared separately from the plastic mounting plate P and secured to the plastic mounting panel P in the above embodiment shown in FIG. 13, it may be formed as a part integral with the plastic mounting plate P as one piece as shown in FIG. 14. A generally L-shaped reinforcement 90 is welded, or otherwise secured, to the inner door panel D1 at a location where the door latch unit 33 is mounted through a fixed bolt at the rear end of the inner door panel D1 in order to provide reliable fixing stiffness of the door latch unit 33 to the inner door panel D1.

Figure 15:
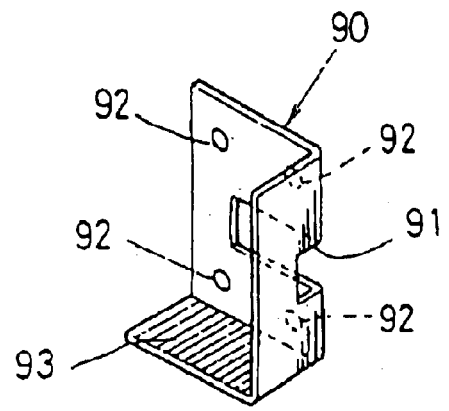
FIG. 15 is a perspective view of a reinforcement plate.

Referring to FIG. 15 showing the L-shaped reinforcement 90 in detail, the L-shaped reinforcement 90, which is made of a steel plate, is formed with a generally rectangular center opening 91 through which the body striker passes across when locking the vehicle door and four bolt holes 92 around the rectangular opening 91 through which bolts are inserted and fastened to the inner door panel D1 in order to fix the door latch unit 33 to the inner door panel D1. The L-shaped reinforcement 90 at its lower end is additionally formed with a bottom rack 93 bent on the side of the door latch unit 33. While the door latch unit 33 itself is comparatively heavy, it is previously supported on the bottom rack 93 of the L-shaped reinforcement 90, so that the work of installing the plastic mounting panel P to the door panel sub-assembly D is made easy, as a result of which, a man-hour in assembling the front door is considerably reduced.

Figure 16:
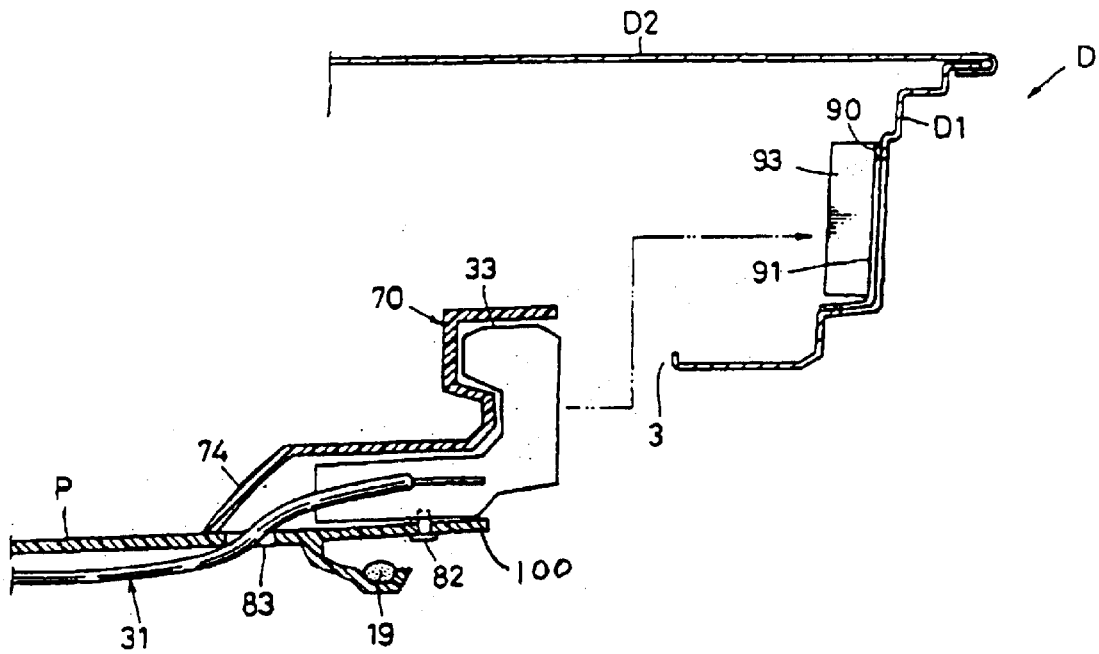
FIG. 16 is an explanatory view showing a steps of installing the plastic mounting panel to the inner door panel.

As shown in FIG. 16, in order to install the plastic mounting panel P to the inner door panel D1, after installing the door latch unit 33, the handle linking cable 31 and the door latch unit cover 70 to the plastic mounting panel P beforehand, the plastic mounting panel P is attached and fixed to the inner door panel P so as to close the aperture 3 of the inner door panel D1. At this time, the door latch unit 33 is previously supported on the bottom rack 93 of the L-shaped reinforcement 90. This provides improvement of workability in installing the plastic mounting panel P to the door panel sub-assembly D.

Figure 17:
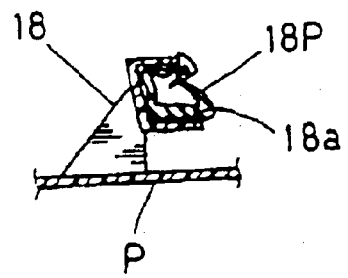
FIG. 17 is a cross-sectional view of window glass guide.

FIG. 17 shows the window glass guide rail 18 of the plastic mounting panel P in cross-section. While a window glass guide rail is conventionally provided separately from the inner door panel D1, however, in the vehicle door of the present invention, the window glass guide rail 18 is configured as a part integral with the plastic mounting panel P. This integrated configuration allows the window glass guide rail 18 to be easily completed by simply fitting a packing strip 18P in a groove 18*a* of the guide rail 18.

Figure 18:
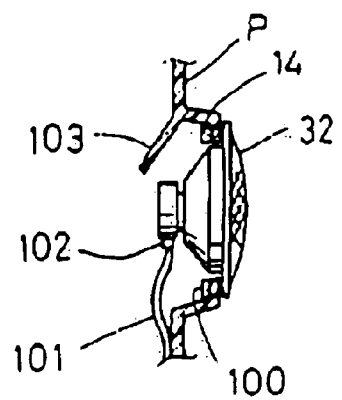
FIG. 18 is a cross-sectional view showing a speaker mounting structure.

FIG. 18 shows the front speaker 32 attached to the speaker mount 14 of the plastic mounting panel P in cross-section. The speaker mount 14 projects toward the passenger compartment. The front speaker 32 is fitted in an opening reinforced by a ring 100 of the speaker mount 14 and is firmly secured by, for example, fixing bolts (not shown) to the speaker mount 14. The speaker 32 at its back is provided with a coupler 102 to which a lead wire 101 extending the harness H is connected so as to receive audio signals. The plastic mounting panel P is formed with a splash guard 103 extending behind and above the front speaker 32 so as to prevent electric parts associated with the front speaker 32 from, for example, raindrops.

Figure 19:
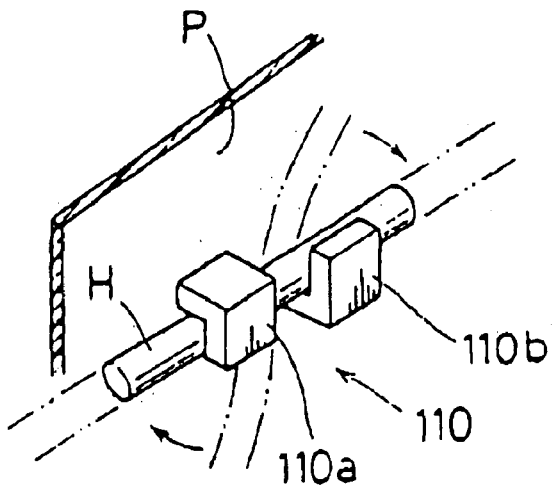
FIG. 19 is a perspective view showing a harness fitting structure.
Figure 20:
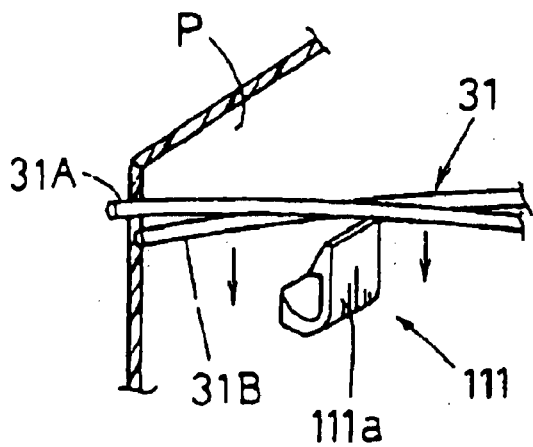
FIG. 20 is a perspective view showing a cable fitting structure.

FIGS. 19 and 20 show anchor structures of the plastic mounting panel P for anchoring the harness H and the handle linking cable 31. As shown in FIG. 19, the plastic mounting panel P is formed with a harness anchor 110 as a part integral therewith for anchoring the harness H. The harness anchor 110 comprises a pair of L-shaped anchor lugs 110a and 110b arranged oppositely in vertical direction. In order to anchor the harness H, the harness H is positioned substantially vertically and put between the L-shaped anchor lugs 110a and 111b as shown by a double-dotted line in FIG. 19. Then, the harness H at opposite parts is bent in opposite directions as shown by arrows so as to bring the opposite parts into engagement with the L-shaped anchor lugs 110a and 110b, respectively. On the other hand, as shown in FIG. 20, the plastic mounting panel P is formed with a cable anchor 111 as a part integral therewith for anchoring the handle linking cable 31. The cable anchor 111 comprises a generally J-shaped anchor lug 11a. In order to anchor the handle linking cable 31, the handle linking cable 31 is inserted between the plastic mounting panel P and the J-shaped anchor lug 111a from above and seat it on the bottom of the J-shaped anchor lug 111a. The anchor structure comprising the harness anchor 110 and the cable anchor 111 (see FIGS. 19 and 20) formed as parts integral with the plastic mounting panel P eliminates any necessity to use anchor clips which have been conventionally prepared separately from the plastic mounting panel P. Therefore, this anchor structure makes wiring work quite simple and easy.

Figure 21:
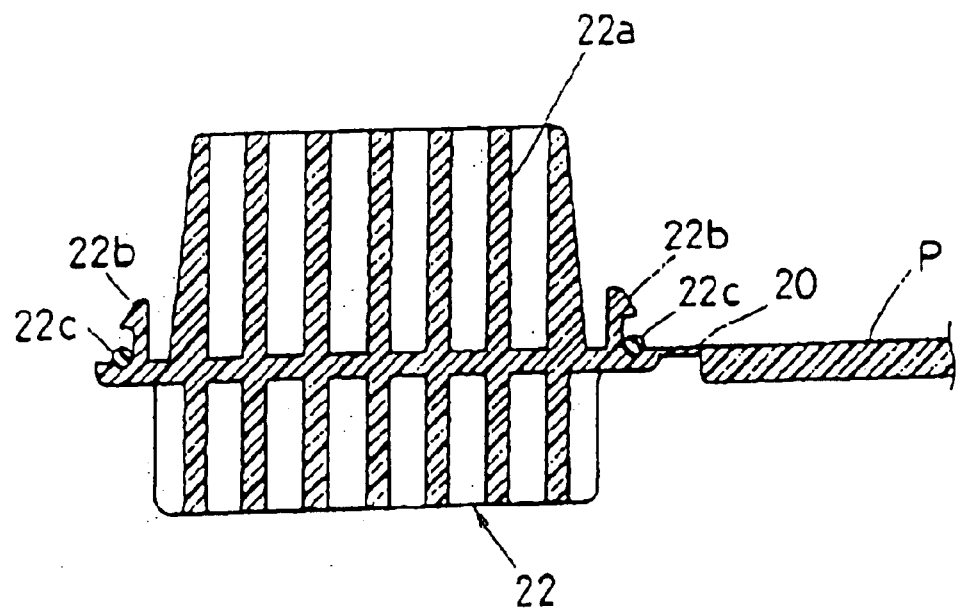
FIG. 21 is a cross-sectional view of the plastic panel with a cover for an exterior door handle access opening left joined.
Figure 22:
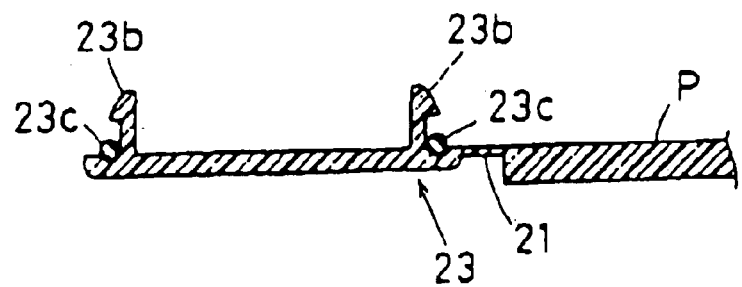
FIG. 22 is a cross-sectional view of the plastic panel with a cover for a window glass access opening left joined.

FIGS. 21 and 22 show the access opening covers 22 and 23 before being separated from the plastic mounting panel P, respectively. As was previously described, the plastic mounting panel P is prepared as one piece having the access opening covers 22 and 23. The plastic plate P is installed to the door panel sub-assembly D with the access opening covers 22 and 23 left joined to the plastic mounting panel P. After having attached the plastic mounting panel P to the door panel sub-assembly D, the access opening cover 22 is separated from the plastic mounting panel P by breaking away the joints 22a and attached to the plastic mounting panel P in position to cover up the access opening 13 which provides an access to the exterior door handle 7 for connecting the handle linking cable 31 to the interior door handle 7. Similarly, after attaching the plastic panel to the door panel sub-assembly D, the access opening cover 23 is separated from the plastic mounting panel P by breaking away the joints 23a and attached to the plastic mounting panel P in position to cover up the access opening 12 which provides an access to the inside of the door panel sub-assembly D for installing the window glass W to the window regulator R. Specifically, as shown in FIG. 21, the access opening cover 22 is formed as an appendant part joined to the plastic mounting panel P by breakable joints 20. The access cover 22 has an impact absorbing lattice structure comprising a plurality of ribs 22a extending in opposite directions and arranged in a lattice pattern. The access opening cover 22 is formed with a hook 22b extending toward the inner door panel D1 in conformity with the access opening 13 so as to surround the shock absorbing lattice structure. A rubber packing ring 22c is seated in an annular recess formed around the shock absorbing lattice structure before or after having separated the access opening cover 22 from the plastic mounting panel P and before attaching it to the plastic mounting panel P to cover up the access opening 13. As shown in FIG. 22, the access opening cover 23 is formed as an appendant part joined to the plastic mounting panel P by breakable joints 21. The access cover 23 is formed with a hook 23b extending toward the inner door panel D1 in conformity with the access opening 12. A rubber packing ring 23c is seated in an annular recess formed around the hook 23b before or after having separated the access opening cover 23 from the plastic mounting panel P and before attaching it to the plastic mounting panel P to cover up the access opening 12.

Figure 23:
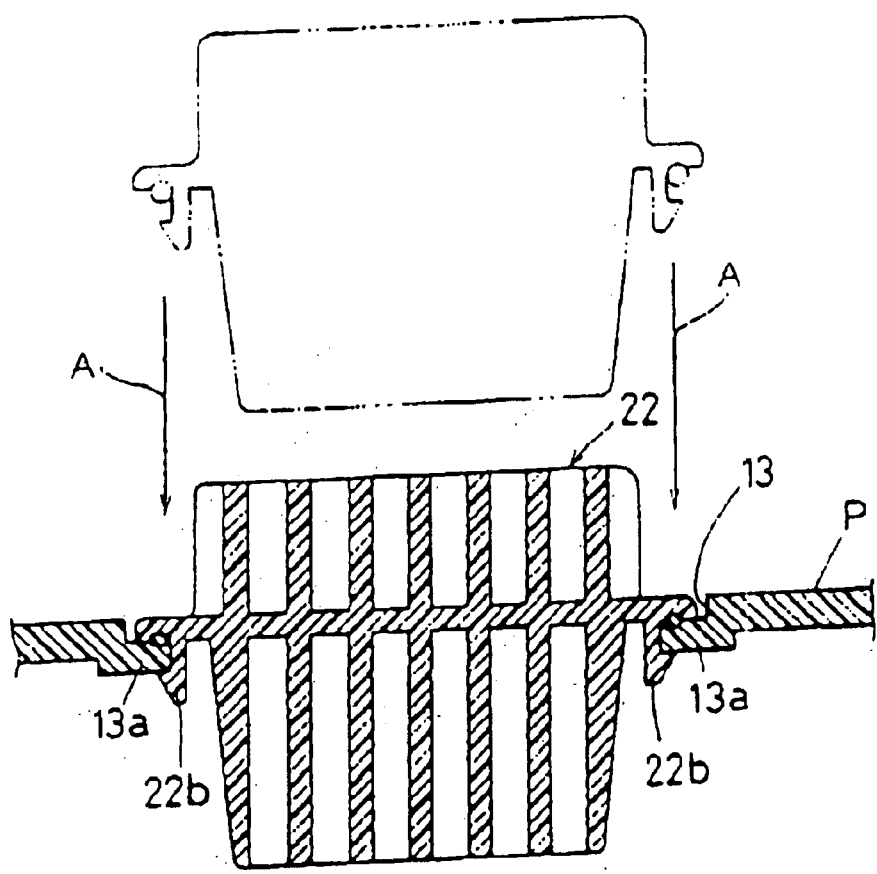
FIG. 23 is a cross-sectional view of the cover fitted in the exterior door handle access opening.
Figure 24:
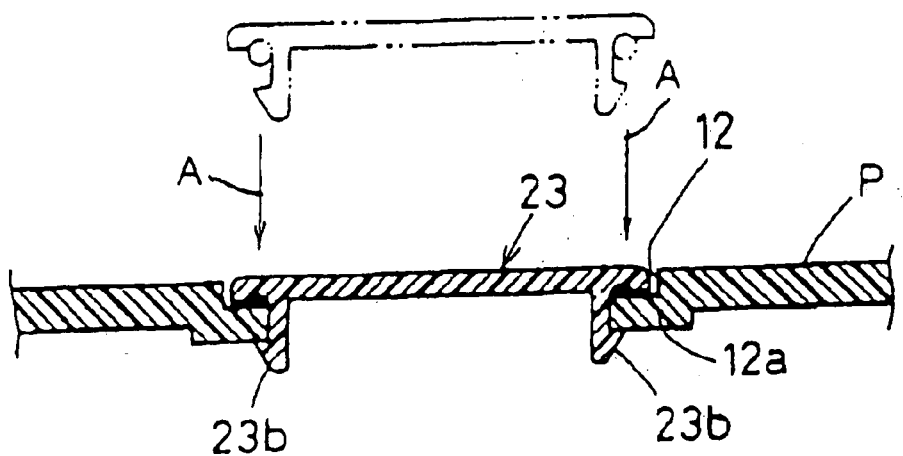
FIG. 24 is a cross-sectional view of the cover fitted in the window glass access opening.

FIGS. 23 and 24 show the access covers 22 and 23 are attached in position to cover up the access openings 13 and 12, respectively. As shown in FIG. 23, the access opening cover 22 is forced toward the plastic mounting panel P so as to bend and fit the hook 22b into the access opening 13 from the side of the passenger compartment as indicated by arrows A. When the hook 22a passes across the periphery 13a of the access opening 13, the hook 22a bends back and engages with the periphery 13a of the access opening 13. In this manner, the access opening cover 22 is easily attached in position to the plastic mounting panel P and is prevented from coming off from the access opening 13. Similarly, as shown in FIG. 24, the access opening cover 23 is forced toward the plastic mounting panel P so as to bend and fit the hook 23b into the access opening 12 from the side of the passenger compartment as indicated by arrows A. When the hook 23a passes across the periphery 12a of the access opening 12, the hook 23a bends back and engages with the periphery 1a of the access opening 12, so that the access opening cover 23 is easily attached in position to the plastic mounting panel P and is prevented from coming off from the access opening 12.

As fully described in detail above in connection with the preferred embodiment, the vehicle door having a plastic mounting panel P to which functional devices and associated parts are mounted and which is installed to an inner door panel D1 so as to close up an aperture 3 of the inner door panel P comprises the door latch unit 33 as a door lock/unlock mechanism mounted to the inner door panel on the far side from the passenger compartment and the handle linking cable 31 as a linking member connected to the door latch unit 33 which passes through a cable guide hole 83 from near the aperture 3 of the inner door panel and extends along the plastic mounting panel partly on the far side from the passenger compartment and partly on the near side to the passenger compartment. According to the vehicle door thus comprised, the handle linking cable 31 is arranged outside the internal space between the inner door panel D1 and the outer door handle D2, so as to reliably prevent the door latch unit 33 and the handle linking cable 31 from an access from the outside of the vehicle with a foul intention to run away with the vehicle.

The vehicle door is provided with the door latch unit cover 70 which covers the door latch unit 33 and a part of the handle linking cable 31 extending along the plastic mounting panel on the far side from the passenger compartment, so as to reliably prevent the door latch unit 33 and the handle linking cable 31 from an access from the outside of the vehicle with a foul intention to run away with the vehicle. The door latch unit cover 70 is fixedly secured in position to the plastic mounting panel P in advance of mounting the door latch unit 33 and the handle linking member to the plastic mounting panel P. Otherwise, the door latch unit cover 70 is formed in position as a part integral with the plastic mounting panel. This integral structure enables to install the plastic mounting panel P with the door latch unit 33 and the handle linking cable 31 mounted thereto and the door latch unit cover 70 to the inner door panel D1 all at once. This provides an effect of simplifying assembling work of the vehicle door work and is of great advantage to decreasing the number of door parts to be assembled.

The vehicle door is assembled by the process of mounting the latch unit 33 as a door lock/unlock member, the handle linking cable 31 as a linking member and the door latch unit cover 70 as a cover member to the plastic mounting panel P as a sub-assembly in advance such that the handle linking cable 31 passes through the cable guide hole 83 formed in the plastic mounting panel P from near the aperture 3 of the inner door panel P and extends along the plastic mounting panel P partly on the far side from the passenger compartment and partly on the near side to the passenger compartment.

The process of assembling the vehicle door improves suitability of the vehicle door for assembling work.

It is to be understood that although the present invention has been described with regard to a preferred embodiment thereof, various other embodiments and variants may occur to those skilled in the art, which are within the scope and spirit of the invention, and such other embodiments and variants are intended to be covered by the following claims.

What is claimed is:

1. A vehicle door for a vehicle, the vehicle door comprising an outer door panel, an inner door panel, and a plastic mounting panel, the inner door panel having a main wall portion extending in a lengthwise direction of the vehicle and a rear wall portion bent and extending toward the outer door panel from a rear end of the main wall portion, the inner door panel being formed with an aperture in the main wall portion, the plastic mounting panel being installed to the inner door panel to cover up the aperture of the inner door panel and having inner and outer surfaces, wherein functional devices of the vehicle door are mounted on the outer surface of the plastic mounting panel adjacent to the outer door panel, the functional devices including at least a door lock and unlock mechanism having at least three sides and a bottom surface, wherein a first one of the three sides of the door lock and unlock mechanism is secured to the rear wall portion of the inner door panel and a second one of the three sides of the door lock and unlock mechanism is mourned to the outer surface of the plastic mounting panel, the door lock and unlock mechanism being operative to lock and unlock the vehicle door, the vehicle door further comprising:

a sealing member disposed between the plastic mounting panel and the inner door panel so as to seal off the aperture of the inner door panel;

an inner door handle installed on the inner surface of the plastic mounting panel remote from the outer door panel and positioned ahead of the door lock and unlock mechanism in the lengthwise direction of the vehicle;

an inner door handle linking member operationally connecting the inner door handle to the door lock and unlock mechanism, the inner door handle linking member extending from the inner door handle along the inner surface of the plastic mounting panel, passing through a guide hole formed in the plastic mounting panel at a position that is remote from the rear end of the main wall portion and close to the door lock and unlock mechanism, and then further extending to the door lock and unlock mechanism along the outer surface of the plastic mounting panel; and a cover member attached to the plastic mounting panel so as to cover the third and remaining sides of the door lock and unlock mechanism and to cover the guide hole and part of the inner door handle linking member which extends from the guide hole formed in the plastic mounting panel to the door lock and unlock mechanism along the outer surface of the plastic mounting panel in order to prevent unauthorized access from outside of the vehicle to the door lock and unlock mechanism and to the inner door handle linking member;

wherein said plastic mounting panel has as an integral part thereof a mounting extension extending between the inner door panel and the cover member and positioned behind the guide hole in the lengthwise direction of the vehicle, and the second one of the three sides of the door lock and unlock mechanism is pre-mounted to the mounting extension.

2. A vehicle door as defined in claim 1, wherein the cover member is fixedly secured to the plastic mounting panel.

3. A vehicle door as defined in claim 1, wherein the cover member is formed as a part integral with the plastic mounting panel.

4. A vehicle door as defined in claim 1, and further comprising an anchor member operative to anchor the inner door handle linking member, the anchor member being formed as a part integral with the plastic mounting panel on the inner surface of the plastic mounting panel.

5. A vehicle door as defined in claim 1, and further comprising a bracket member operative to hold the inner door handle, the bracket member being formed as a part integral with the plastic mounting panel on inner surface of the plastic mounting panel.

6. A vehicle door as defined in claim 1, and further comprising an outer door handle installed to the outer door panel, a key cylinder installed to the outer door panel, an outer door handle linking member operationally connecting the outer door handle to the door lock and unlock mechanism, and a door key linking member operationally connecting the key cylinder to the door lock and unlock mechanism;

wherein the cover member is configured so as to cover a part of the outer door handle linking member and a part of the door key linking member.

7. A vehicle door for a vehicle, the vehicle door comprising an outer door panel, an inner door panel, and a plastic mounting panel, the inner door panel having a main wall portion extending in a lengthwise direction of the vehicle and a rear wall portion bent and extending toward the outer door panel from a rear end of the main wall portion, the inner door panel being formed with an aperture in the main wall portion, the plastic mounting panel being installed to the inner door panel to cover up the aperture of the inner door panel and having inner and outer surfaces, wherein functional devices of the vehicle door are mounted on the outer surface of the plastic mounting panel adjacent to the outer door panel, the functional devices including at least a door lock and unlock mechanism having at least three sides and a bottom surface, wherein a first one of the three sides of the door lock and unlock mechanism is secured to the rear wall portion of the inner door panel and a second one of the three sides of the door lock and unlock mechanism is mounted to the outer surface of the plastic mounting panel, the door lock and unlock mechanism being operative to lock and unlock the vehicle door, the vehicle door further comprising:

a sealing member disposed between the plastic mounting panel and the inner door panel so as to seal off the aperture of the inner door panel;

an inner door handle installed on the inner surface of the plastic mounting panel remote from the outer door panel and positioned ahead of the door lock and unlock mechanism in the lengthwise direction of the vehicle;

an inner door handle linking member operationally connecting the inner door handle to the door lock and unlock mechanism, the inner door handle linking member extending from the inner door handle along the inner surface of the plastic mounting panel, passing through a guide hole formed in the plastic mounting panel at a position that is remote from a the rear end of the main wall portion and close to the door lock and unlock mechanism, and then further extending to the door lock and unlock mechanism along the outer surface of the plastic mounting panel; and a cover member attached to the plastic mounting panel so as to cover the third and remaining sides of the door lock and unlock mechanism and to cover the guide hole and part of the inner door handle linking member which extends from the guide hole formed in the plastic mounting panel to the door lock and unlock mechanism along the outer surface of the plastic mounting panel in order to prevent unauthorized access from outside of the vehicle to the door lock and unlock mechanism and to the inner door handle linking member.

8. A vehicle door as defined in claim 7, and further comprising an outer door handle installed to the outer door panel, a key cylinder installed to the outer door panel, an outer door handle linking member operationally connecting the outer door handle to the door lock and unlock mechanism, and a door key linking member operationally connecting the key cylinder to the door lock and unlock mechanism;

wherein the cover member is configured so as to cover a part of the outer door handle linking member and a part of the door key linking member.

* * * * *